United States Patent [19]
Burman

[11] Patent Number: 5,522,474
[45] Date of Patent: Jun. 4, 1996

[54] APPARATUS AND METHOD FOR CHANGING AUTOMATIC TRANSMISSION FLUID

[76] Inventor: Jerry L. Burman, 406 Fox Valley #1015, Longwood, Fla. 32779

[21] Appl. No.: 319,593

[22] Filed: Oct. 7, 1994

[51] Int. Cl.$^6$ .................................................. F16N 33/00
[52] U.S. Cl. ...................... 184/1.500; 184/6.4; 184/108; 141/98
[58] Field of Search .............................. 184/1.5, 6.4, 96, 184/104.3, 105.1, 108; 123/196 R; 134/169 A; 141/98; 60/413, 417

[56] References Cited

U.S. PATENT DOCUMENTS

| | | | |
|---|---|---|---|
| 820,508 | 5/1906 | Leonhardt | 184/96 |
| 3,513,941 | 5/1970 | Becnel | 184/1.5 |
| 3,983,958 | 10/1976 | Swearingen | 184/108 |
| 4,031,966 | 6/1977 | Farrell | 60/417 |
| 4,807,674 | 2/1989 | Sweet | 184/1.5 |
| 5,318,080 | 6/1994 | Viken | 184/1.5 |
| 5,361,870 | 11/1994 | Caurcy | 184/108 |

FOREIGN PATENT DOCUMENTS

| | | | |
|---|---|---|---|
| 0675835 | 12/1963 | Canada | 60/413 |
| 0072299 | 3/1990 | Japan | 184/1.5 |

*Primary Examiner*—Edward K. Look
*Assistant Examiner*—Christopher Verdier
*Attorney, Agent, or Firm*—Macdonald J. Wiggins

[57] ABSTRACT

A system and method for extracting used transmission fluid from an automatic transmission in a motor vehicle utilizing the vehicle engine. A reservoir is provided having a free floating piston therein, dividing the reservoir into two chambers. A first flexible line connects from a first chamber to a transmission fluid outlet of the transmission, and a second flexible line connects from a second chamber to a fluid input of a transmission fluid cooler. The second chamber is initially filled with fresh fluid forcing the piston toward the first chamber. Operation of the vehicle engine causes the transmission pump to pump used fluid into the first chamber, forcing the piston to expell fresh fluid from the second chamber, and into the cooler and transmission. A sight gauge in the first flexible line permits visual monitoring of the flow of dark, used fluid to determine when all of the fluid in the transmission has been ejected, collected in the first chamber for disposal, and completely replaced with fresh fluid.

8 Claims, 1 Drawing Sheet

APPARATUS AND METHOD FOR CHANGING AUTOMATIC TRANSMISSION FLUID

BACKGROUND OF THE INVENTION

1. Field of the Invention

The present invention relates to changing automatic transmission fluid in automobiles, and more particularly to an apparatus and method for achieving a complete change of such fluid.

2. Description of the Prior Art

To maintain the integrity of an automatic transmission in a motor vehicle, it is necessary to periodically change the fluid. Such fluids, due to heat and pressure, deteriorate with mileage of the vehicle. Small particles of metal and the like, as the transmission wears, as well as carbon and similar substances from various materials in the transmission mix with the fluid. If fluid changes are not made at the designated periods, slippage of the transmission can occur, and eventually, the transmission fails. When fluid is drained from the transmission case at recommended periods, the used fluid will be found to be dark, indicating contaminants in the oil. Further, draining fluid by removing the transmission pan, the usual procedure, does not drain the torque converter, the transmission fluid cooler, or other areas of the transmission. It has been estimated that 50% and more of the fluid is not removed by draining only the pan. Thus, after the usual prior art method of changing the transmission fluid, a significant portion of the oil still contains contaminants, reducing the life of the transmission. It is to be noted that the volume of contaminants in a transmission will accumulate with successive fluid changes.

This problem has been recognized. U.S. Pat. No. 4,807,674 to Sweet uses a special external can with two hoses. One hose connects to a vacuum fitting on the carburetor and the other is inserted into the dip stick tube, thus using the engine vacuum to withdraw the fluid. However, no means for determining if all of the fluid has been removed is shown. Gas pressure from an external tank, and the vehicle engine, are used to remove transmission fluid in Becnel, U.S. Pat. No. 3,513,941, and the expressed fluid is caught in an open container. Brown, in U.S. Pat. No. 5,291,968 teaches a drain pan under the transmission, removal of the transmission pan and collecting the fluid for disposal. He then uses an external pump to force new fluid from a reservoir into an outlet of the transmission. The engine is then used to pump the remainder of the used fluid out as the fresh fluid is pumped in. Brown notes that simply removing the transmission pan allows only about three quarts of fluid to be drained, of the fluid capacity of twelve quarts.

Japanese patent number 2-72299 shows two tanks, interconnected by valves. An external pump connects to the oil cooler fitting and draws fluid from the transmission through the cooler and into a first tank. A solenoid valve is used to switch the pump to draw fresh fluid from a second tank and into the transmission via the oil cooler. Thus, external power must be available.

There is an unfilled need for a simple, low cost system and method that can completely change transmission fluid in a vehicle quickly and easily using the vehicle engine, and without use of external power equipment.

SUMMARY OF THE INVENTION

The present invention provides a low cost apparatus that removes all of the fluid from an automatic transmission, and in the same operation, replaces the used fluid with fresh fluid. Thus, the operation is performed with one step, and also provides a positive indication that all of the used fluid has been removed and replaced.

A preferably cylindrical reservoir is provided having closed ends. The volume of the reservoir is selected to be greater than the fluid capacity of the vehicle transmission; for example, a 12 to 14 quart capacity will handle most vehicles. An inlet fitting is provided at one end of the reservoir and an outlet fitting at the other end. One end of a first flexible line connects to the outlet fitting of the reservoir, with the other end for connection to the automobile oil cooler line. A sight gauge is connected to an inlet fitting of the reservoir. A second flexible line is connected to the inlet fitting of the sight gauge, and the other end to the transmission fluid fitting on the transmission case.

The reservoir has a floating piston that can freely move therein. Assuming that the reservoir is initially empty, the first flexible line is connected to a source of fresh fluid, and the reservoir filled with fluid, forcing the floating piston to the inlet end of the reservoir.

Preparatory to changing the fluid in a transmission, the vehicle fluid line between the transmission and the fluid cooler is disconnected at the transmission end. The first flexible line is connected to the vehicle line from the cooler, and the second fluid line from the sight gauge is connected to the transmission fitting. As will be recognized, the reservoir is now between the transmission fluid outlet and the cooler inlet. The vehicle engine is started, causing the used fluid to flow through the sight gauge into the reservoir, forcing the floating piston toward the opposite end of the reservoir. This action forces the fresh fluid from the reservoir through the cooler and into the transmission.

As the used fluid flows through the sight gauge, the dark, worn fluid is monitored. The engine is allowed to run until the fluid seen in the sight gauge is clear, as easily determined by the distinctive red color of the fresh fluid.

The engine is allowed to run until the fluid in the sight gauge is clear of contaminants, indicating that all of the old fluid has been displaced and replaced with the fresh fluid. At that point, the engine is turned off, and the line from the cooler to the transmission replaced. As will now be understood, a simple, efficient fluid changer has been described, requiring no external pumps nor energy, that can be operated quickly and cleanly. After use, the old fluid can be drained from the inlet chamber, and the outlet chamber refilled for the next use.

It is therefore a principal object of the invention to provide a simple apparatus and method for completely and rapidly replacing used transmission fluid from a vehicle's automatic transmission with fresh fluid.

It is another object of the invention to provide a reservoir for connection between a transmission fluid outlet and a fluid cooler inlet, the reservoir containing fresh transmission fluid, such that operation of the vehicle engine will completely transfer all used fluid from the transmission to the reservoir and replace the used fluid with fresh fluid from the reservoir.

It is yet another object of the invention to provide a reservoir having a floating piston in which one chamber of the reservoir may contain used transmission fluid, and in which a second chamber may be filled with fresh fluid while simultaneously removing the used fluid from the first chamber to be recycled.

These and other objects and advantages of the invention will be apparent with reference to the following detailed description and the drawings.

DETAILED DESCRIPTION OF THE PREFERRED EMBODIMENT

Figure 1:
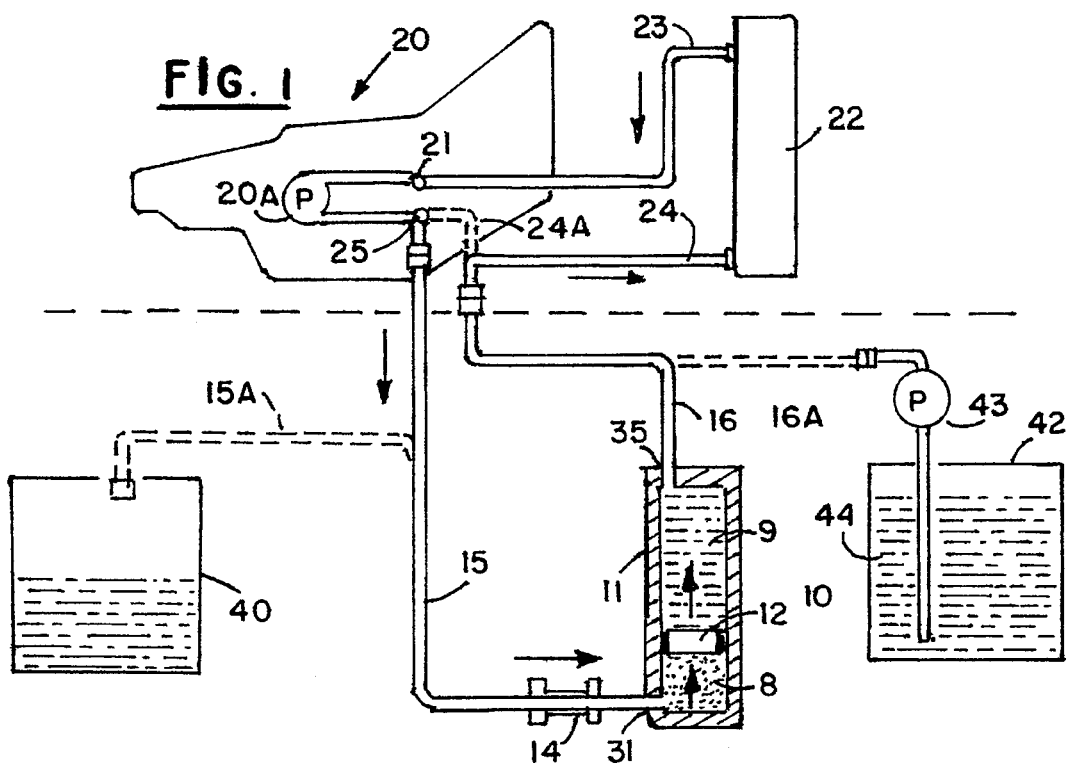
FIG. 1 is a simplified block diagram of the invention showing a transmission fluid reservoir and fluid changing operation, and having means for collection of used fluid in the reservoir as fresh fluid replaces the used fluid in the transmission, and means for refilling the reservoir with fresh fluid while collecting used fluid for recycling, with latter means shown in phantom view.

With reference to FIG. 1, a block diagram of the system is presented. A vehicle transmission 20 and a transmission fluid cooler 22 is shown. A first fluid line 24 is shown having a first end thereof connected to an inlet of transmission cooler 22, and a second end thereof removed from transmission fitting 25. Return fluid line 23 is connected to fluid inlet 21 of transmission 20.

Reservoir 10 of the invention comprises a closed cylinder 11 having a free floating piston 12 therein. Cylinder 11 includes an inlet port 31 and an outlet port 35. As shown for purposes of explanation, transmission 20 is being operated by the vehicle engine (not shown). System inlet line 15 is connected between fluid outlet 25 of transmission 20, and between to inlet 31 of reservoir 11 via sight gauge 14. The internal fluid pump 20A of transmission 20 has forced used fluid 8 into the lower chamber of reservoir 11 indicated as dark, contaminated fluid. In the figure, piston 12 has been forced upward from the transmission pump pressure which has forced fresh fluid from reservoir outlet 35 through lines 16 and 24 through fluid cooler 22 and into transmission 20 via fitting 21.

As will be understood, continued operation of the vehicle engine will pump fresh fluid 9 from the reservoir 11. Thus, the flow of used fluid 12 is being replaced in transmission 20 with fresh fluid 9 from reservoir 11. Sight gauge 14 is monitored by the operator as the operation continues. Initially, dark, used fluid will be observed in sight gauge 14. As the process continues, more fresh fluid 9 will flow into transmission 20, and the fluid in the sight gauge will begin to clear up. When little observable contamination is seen in the returning fluid, the engine can be turned off, line 24 disconnected from line 16 and reconnected to outlet 25 of transmission 20 as indicated by phantom line 24A.

At this point, the used transmission fluid has been completely replaced with fresh fluid 9, and the used fluid 8 has been captured in reservoir 11. To collect used fluid 8 for disposal or recycling, and to refill reservoir 11 with fresh fluid, flexible line 15 is disconnected from transmission outlet 25, and rerouted to a collection tank 40, as indicated in phantom view of line 15A. At this point, line 16, shown in phantom view 16A, is connected to an outlet of pump 43, which is preferably a small electric pump. However, other types of pumps are suitable, such as hand pumps. Pump 43 draws fresh transmission fluid 44 from any type of bulk storage facility such as tank 42.

As pump 43 forces fresh fluid into reservoir 11, piston 12 is forced downward, thereby forcing used fluid 8 into fluid recovery tank 40 via line 15–15A. When all used fluid 8 is pumped from reservoir 11, the maximum amount of fresh fluid 9 will be found in the output chamber, ready for the next use.

Figure 2:
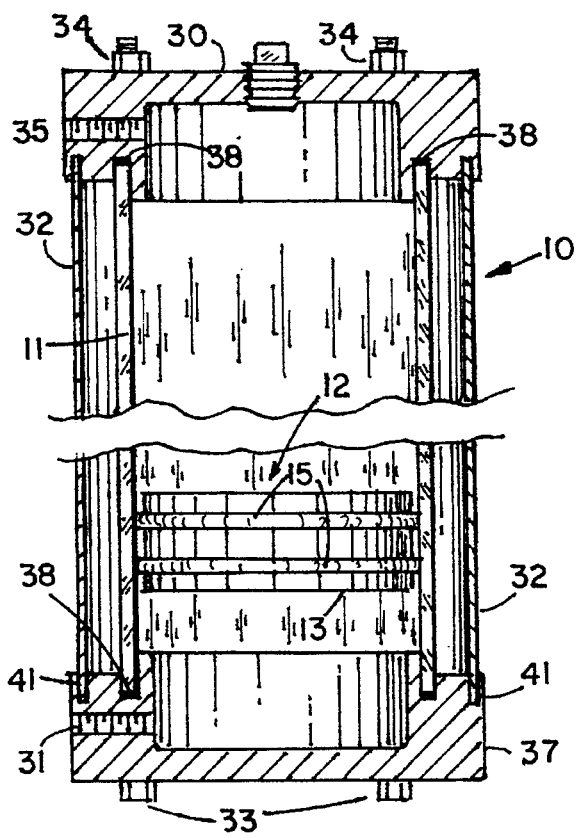
FIG. 2 is a cross sectional view of a preferred implementation of the reservoir of the invention.

FIG. 2 is a cross sectional view of a preferred embodiment of the reservoir 10. An open cylinder 11 may be formed of glass, plastic, metal or the like. However, a plastic cylinder 11 is preferred. The ends of cylinder 11 are clamped between a pair of end caps 30 and 37, and include gaskets 38 for sealing. A cylindrical piston 12 floats in cylinder 11, and comprises piston element 13, and gasket rings 15. As will be recognized, piston 12 is free to move within cylinder 11. End cap 30 includes a threaded inlet 35 for attachment of a fitting thereto. Similarly, end cap 37 has an inlet 31. Caps 30, 37 are clamped by four bolts 33 and nuts 34. Inlet 31 provides for an inlet fitting, not shown, for coupling to sight gauge 14; and outlet 35 provides for an outlet fitting. A metal cylinder 32 is disposed in circular slots 38 in end caps 30 and 37 to protect cylinder 11 from damage.

Figure 3:
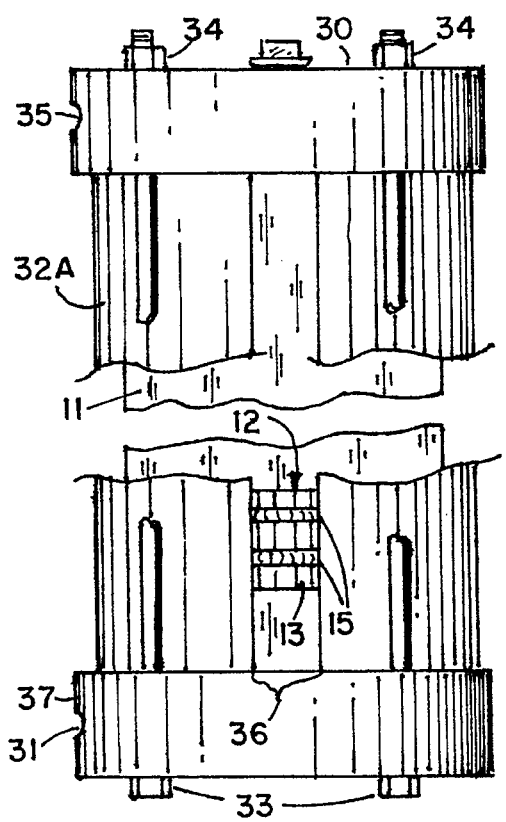
FIG. 3 is a partially cutaway view of the reservoir of FIG. 2, illustrating an alternative design for the reservoir.

An alternative design of reservoir 10 is shown in FIG. 3 having a similar construction as cylinder 10 and in which corresponding reference numerals are use where applicable. However, metal cylinder 32A has a gap 36 along the length of cylinder 11. This change permits the used transmission fluid 8 below piston 13 and the fresh fluid 9 above piston 13 to be seen and monitored during a fluid change operation. A primary purpose of this construction is to permit a vehicle owner to observe the fluid changing process, thus providing a dramatic presentation of the importance of a complete draining of all used transmission fluid, and the advisability of having frequent changes to maintain the integrity of the transmission. This demonstration can be made more dramatic by providing a second gap 36 (not shown opposite the gap shown in FIG. 3. Illumination by a lamp at the back gap will emphasize the contaminants in the used fluid and the clarity of the fresh fluid.

An improved device and method for completely changing the transmission fluid in the transmission and the fluid cooler has been disclosed. The invention permits essentially one hundred percent of the used fluid to be removed and concurrently replaced with fresh fluid, unlike the usual practice draining part of the used fluid, and thereafter replacing only a portion of the used fluid. In accordance with the invention, the fluid is changed without removing the transmission pan, and requiring the temporary removal of only one line from the transmission. Further, the vehicle owner can observe the entire operation which can be completed in a short time. After completion of the fluid changing process, the reservoir may be quickly refilled with fresh fluid while simultaneously expelling the used fluid into a collection tank for recycling. Although details of the preferred embodiment of the invention have been disclosed for illustrative purposes, various changes can be made without departing from the scope and spirit of the invention.

I claim:

1. A system for extracting used transmission fluid from an automatic transmission of a motor vehicle and from a transmission fluid cooler thereof, and for refilling the transmission and the cooler with fresh transmission fluid, said transmission having a fluid outlet comprising;

a) a reservoir having first and second ends and a free floating piston disposed therein, said piston thereby forming first and second chambers;

b) an inlet to said first chamber at said first end of said reservoir, and an outlet from said second chamber at said second end of said reservoir, said second chamber for containing transmission fluid;

c) a first flexible line having a first end thereof attached to said inlet of said reservoir, and a second end thereof attached to said fluid outlet of said transmission;

d) a second flexible line having a first end thereof attached to said outlet of said reservoir, and a second end thereof attached to an inlet of said transmission fluid cooler; and e) means for visually monitoring fluid flowing from said transmission fluid outlet into said first chamber of said reservoir, f) whereby said first chamber is for receiving transmission fluid from said transmission, and said second chamber is used for providing transmission fluid to said cooler and said transmission.

2. The system as defined in claim 1 in which a pump in said automatic transmission pumps said fluid to said first chamber, and said piston forces said fresh fluid into said cooler and said transmission when an engine of said vehicle is operated.

3. The system as defined in claim 1 in which said reservoir is cylindrical.

4. The system as defined in claim 3 in which said reservoir is cylindrical and includes a protective metal cylinder around said reservoir.

5. The system as defined in claim 4 in which said metal cylinder includes a longitudinal slot therein for permitting visual monitoring of said reservoir.

6. The system as defined in claim 5 in which said metal cylinder includes two diametrically opposed longitudinal slots to permit lighting of said fluids during monitoring thereof.

7. A system for extracting used transmission fluid from an automatic transmission and from a transmission fluid cooler thereof, and for refilling the transmission and the cooler with fresh fluid, said transmission having a fluid outlet comprising:

a) a transparent cylindrical reservoir having first and second ends and a cylindrical free floating piston disposed therein, thereby forming first and second chambers;

b) an inlet to said first chamber at said first end of said reservoir, and an outlet from said second chamber at said second end of said reservoir, said second chamber for containing transmission fluid;

c) a first flexible line having a first end thereof attached to said inlet of said reservoir, and a second end thereof attached to said fluid outlet of said transmission;

d) a second flexible line having a first end thereof attached to said outlet of said reservoir, and a second end thereof attached to an inlet of said transmission fluid cooler;

e) whereby said first chamber receives transmission fluid from said transmission, and said second chamber provides fluid to said cooler and said transmission, and f) an opaque cylindrical sleeve having a longitudinal slot therein, said sleeve disposed around said transparent cylindrical reservoir, wherein said slot permits visual monitoring of fluid flowing from said transmission fluid outlet into said first chamber of said reservoir to thereby indicate when a complete interchange of fluid for fluid of said fluid cooler and said transmission has been completed.

8. In a system for extracting used transmission fluid from a vehicle having an automatic transmission, the transmission having a fluid pump, and a fluid cooler for the transmission, the transmission having a fluid outlet and the fluid cooler having a fluid inlet, the system having an external fluid reservoir including a free-floating piston therein for thereby forming first and second chambers, the first chamber having a first fluid line attached thereto, and the second chamber having a second fluid line attached thereto, a method of exchanging used fluid in the transmission for fresh fluid, comprising the steps of:

a) filling the first chamber of said reservoir with transmission fluid to cause the piston to expell fluid from the second chamber;

b) connecting the second fluid line to the transmission cooler input;

c) connecting the first fluid line from the first chamber to the transmission fluid outlet;

c) operating the vehicle engine to thereby cause the transmission fluid pump to force fluid from the transmission into the first chamber thereby causing the free-floating piston to force the fluid from the second chamber into the fluid cooler and into the vehicle transmission;

d) visually monitoring the fluid flow into the first chamber until clear fluid appears therein;

e) therafter disconnecting a first end of the second fluid line from the transmission fluid outlet and connecting the first end thereof to a used fluid collection container;

f) disconnecting a first end of the second fluid line from the transmission cooler input and thereafter connecting the first end thereof to a source of fresh transmission fluid; and g) pumping fresh fluid from the source thereof to thereby cause the floating piston to expel the used fluid into the fluid collection container.

* * * * *